US008270116B2

(12) United States Patent
Shimizu et al.

(10) Patent No.: US 8,270,116 B2
(45) Date of Patent: Sep. 18, 2012

(54) MAGNETIC DISK DRIVE AND MAGNETIC HEAD SLIDER WITH STABILIZED FLYING

(75) Inventors: Yuki Shimizu, Ibaraki (JP); Junguo Xu, Ibaraki (JP); Jianhua Li, Kanagawa (JP); Takanori Yamazaki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 739 days.

(21) Appl. No.: 11/522,117

(22) Filed: Sep. 14, 2006

(65) Prior Publication Data
US 2007/0086112 A1    Apr. 19, 2007

(30) Foreign Application Priority Data
Sep. 14, 2005   (JP) ................ 2005-266257

(51) Int. Cl.
*G11B 5/60*    (2006.01)
(52) U.S. Cl. .................. 360/235.7; 360/236.3
(58) Field of Classification Search .......... 360/235.7, 360/235.4, 235.5, 236.5, 235.6, 235.8, 236.3, 360/236.6, 236.1, 234.3, 235.9, 236, 236.2, 360/236.4, 236.7, 236.8, 236.9, 237, 237.1
See application file for complete search history.

(56) References Cited

U.S. PATENT DOCUMENTS

| | | | |
|---|---|---|---|
| 4,218,715 A * | 8/1980 | Garnier ............... | 360/236.2 |
| 5,831,792 A * | 11/1998 | Ananth ............... | 360/236.6 |
| 5,978,176 A * | 11/1999 | Ezaki et al. ............ | 360/236.5 |
| 6,212,042 B1 * | 4/2001 | Gui et al. .............. | 360/236.6 |
| 6,227,042 B1 * | 5/2001 | Ruiz ................... | 73/105 |
| 6,233,118 B1 | 5/2001 | Boutaghou et al. | |
| 6,366,429 B1 | 4/2002 | Stover et al. | |
| 6,560,071 B2 * | 5/2003 | Chapin et al. .......... | 360/235.7 |
| 6,594,113 B2 * | 7/2003 | Rao et al. .............. | 360/235.8 |
| 6,989,967 B2 | 1/2006 | Pendray et al. | |
| 7,023,664 B2 | 4/2006 | Crone et al. | |
| 2001/0013994 A1 * | 8/2001 | Tokisue et al. .......... | 360/236.3 |
| 2002/0191340 A1 * | 12/2002 | Chapin et al. .......... | 360/235.8 |
| 2004/0150913 A1 * | 8/2004 | Yoshida et al. ......... | 360/235.5 |
| 2005/0231852 A1 * | 10/2005 | Tian et al. ............. | 360/235.8 |

FOREIGN PATENT DOCUMENTS

| | | |
|---|---|---|
| JP | 2000-353370 | 12/2000 |
| JP | 2003099910 * | 4/2003 |
| JP | 2003-515869 A | 5/2003 |
| JP | 2004-55127 | 2/2004 |
| JP | 2005-166236 A | 6/2005 |

* cited by examiner

*Primary Examiner* — Brian Miller
(74) *Attorney, Agent, or Firm* — Patterson & Sheridan, LLP

(57) ABSTRACT

A magnetic disk drive includes a magnetic recording medium and a magnetic head slider adapted to fly over a surface of a magnetic recording medium and read or write information. The magnetic head slider includes a slider air bearing surface and a magnetic transducer. The slider air bearing surface includes a front pad having front rail surfaces and front step bearing surfaces, a rear pad having a rear rail surface and a rear step bearing surface, and a negative-pressure groove interposed between the front pad and the rear pad. A vibration suppressing groove is formed in the rear rail surface so as to be deeper than the rear rail surface and to be closed at its periphery. The vibration suppressing groove quickly damps out translational and pitching vibrations in the flying height direction of the magnetic head slider while stabilizing its flying.

18 Claims, 12 Drawing Sheets

MAGNETIC DISK DRIVE AND MAGNETIC HEAD SLIDER WITH STABILIZED FLYING

CROSS-REFERENCES TO RELATED APPLICATIONS

This application claims priority from Japanese Patent Application No. JP2005-266257, filed Sep. 14, 2005, the entire disclosure of which is incorporated herein by reference.

BACKGROUND OF THE INVENTION

The present invention relates to a magnetic disk drive and a magnetic head slider.

A conventional magnetic disk drive reads or writes information while a magnetic head slider which carries a magnetic read/write head thereon flies over a rotating magnetic recording medium. When the flying magnetic head slider undergoes disturbance from the exterior of the magnetic disk drive or comes into contact with the rotating magnetic recording medium, it vibrates in its flying height direction.

To attain higher density magnetic recording, the flying height of the magnetic head slider has been becoming increasingly low every year and at present the flying height is as low as near 10 nm. However, the lowering of the flying height of the magnetic head slider increases the probability of contact between the magnetic head slider and the surface of the magnetic recording medium, with the result that the reliability of the magnetic disk drive may be deteriorated. Therefore, it is necessary for the magnetic head slider to fly stably in the interior of the magnetic disk drive.

To stabilize the flying of the magnetic head slider in the conventional magnetic disk drive, the following techniques have been adopted. For example, like a negative-pressure magnetic head slider, a negative-pressure groove is formed in an air bearing surface of the magnetic head slider to enhance the rigidity of an air bearing between the magnetic head slider and the magnetic recording medium, thereby enhancing the resistance to disturbance. A fine texture shape is formed in the air bearing surface of the magnetic head slider to diminish a frictional force induced upon contact of the magnetic head slider with the magnetic recording medium.

An attempt has recently been made to improve the rail surface shape of the air bearing surface of the magnetic head slider, thereby stabilizing the flying of the magnetic head slider. For example, in Japanese Patent Laid-open No. 2000-353370 (Patent Literature 1), a pressure control groove is formed in a negative-pressure groove of the air bearing surface of a magnetic head slider to control the flying height, thereby suppressing variations in flying height of the magnetic head slider to stabilize the flying of the same slider. Further, for example, in Japanese Patent Laid-open No. 2004-71140 (Patent Literature 2), an air bearing surface of a magnetic head slider is formed in a U-shape which opens toward a leading edge side to decrease the sensitivity of a change in flying height of the air bearing surface caused by variations in manufacture, for example, thereby stabilizing the flying of the magnetic head slider. These techniques can be easily implemented by merely increasing the number of steps in the machining process for the air bearing surface of the conventional magnetic head slider. Taking this point into account, it can be said that the above techniques are effective in stabilizing the flying of the magnetic head slider.

However, the magnetic disk drives disclosed in Patent Literatures 1 and 2 are for improving the stability during flying of the magnetic head slider to prevent the occurrence of a large vibration of the magnetic head slider. When the magnetic head slider vibrates largely in its flying height direction due to a shock from the exterior of the magnetic disk drive or due to an environmental change or when the magnetic head slider vibrates due to contact thereof with the magnetic recording medium, the magnetic disk drives disclosed in Patent Literatures 1 and 2 are not so effective. The magnetic head slider and the magnetic recording medium are designed so as to permit a slight mutual contact. However, when they are in continuous or strong contact with each other, it is very likely that one or both may suffer physical and magnetic damage. If a large vibration of the magnetic head slider continues, it is very likely that continuous or strong contact of the magnetic head slider with the magnetic recording medium may occur and therefore it is desired to damp the vibration of the magnetic head slider quickly.

BRIEF SUMMARY OF THE INVENTION

The present invention provides a magnetic disk drive and a magnetic head slider capable of quickly damping translational and pitching vibrations in the flying height direction of the magnetic head slider while stabilizing the flying of the magnetic head slider.

The present invention also provides a magnetic disk drive and a magnetic head slider capable of quickly damping translational, pitching and rolling vibrations in the flying height direction of the magnetic head slider while stabilizing the flying of the magnetic head slider.

In one aspect of the present invention there is provided a magnetic disk drive including:

a magnetic recording medium for recording information; and a magnetic head slider adapted to fly over a surface of the magnetic recording medium and read or write information from or to the magnetic recording medium; wherein the magnetic head slider includes a slider air bearing surface opposed to the surface of the magnetic recording medium and a magnetic transducer for reading or writing of information. The slider air bearing surface includes: a front pad including, on a leading edge side, a front rail surface and a front step bearing surface deeper than the front rail surface; a rear pad including, on a trailing edge side, a rear rail surface and a rear step bearing surface deeper than the rear rail surface; and a negative-pressure groove interposed between the front pad and the rear pad. The magnetic transducer is disposed near a trailing edge of the rear rail surface of the rear pad. A vibration suppressing groove is formed in the rear rail surface of the rear pad so as to be deeper than the rear rail surface and to be closed at a periphery (i.e., the peripheral rear rail surface) thereof.

The following are preferred specific constructional examples in the above first aspect of the present invention.

(1) The vibration suppressing groove is formed in proximity to the leading edge of the magnetic transducer.

(2) An air flow adjusting groove is formed in the rear step bearing surface to be open toward the leading edge side so that the amount of an air flow advancing toward the vibration suppressing groove increases, the rear step bearing surface being positioned on the leading edge side with respect to the rear rail surface.

(3) Side pads are provided which are positioned on both sides of the slider air bearing surface to have respective side rail surfaces. In addition, the side rail surfaces are each provided with a vibration suppressing groove formed deeper than the side rail surfaces and closed at a periphery thereof.

In a second aspect of the present invention there is provided a magnetic disk drive including: a magnetic recording medium for recording information; and a magnetic head slider adapted to fly over a surface of the magnetic recording medium for reading or writing information from or to the magnetic recording medium; wherein the magnetic head slider includes a slider air bearing surface opposed to the surface of the magnetic recording medium and a magnetic transducer for reading or writing of information. The slider air bearing surface includes: a front pad including, on a leading edge side, a front rail surface and a front step bearing surface deeper than the front rail surface; a rear pad including, on a trailing edge side, a rear rail surface and a rear step bearing surface deeper than the rear rail surface; and a negative-pressure groove interposed between the front pad and the rear pad. The magnetic transducer is disposed near a trailing edge of the rear rail surface of the rear pad. Side pads are positioned on both sides of the slider air bearing surface so as to have respective side rail surfaces, and the side pad surfaces are each provided with a vibration suppressing groove formed deeper than the side rail surfaces and closed at a periphery thereof.

The following are preferred specific constructional examples in the above second aspect of the present invention.

(1) The side rail surface and the side step bearing surface deeper than the side rail surface constitute the side pad, and the side step bearing surfaces are formed contiguously to the front step bearing surface.

(2) The rear rail surface of the rear pad is provided with a vibration suppressing groove formed deeper than the rear rail surface and closed at a periphery thereof.

In a third aspect of the present invention there is provided a magnetic head slider adapted to fly over a surface of a magnetic recording medium and read or write information from or to the magnetic recording medium. This magnetic slider includes: a slider air bearing surface including: a front pad including, on a leading edge side, a front rail surface and a front step bearing surface deeper than the front rail surface; a rear pad including, on a trailing edge side, a rear rail surface and a rear step bearing surface deeper than the rear rail surface; and a negative-pressure groove interposed between the front pad and the rear pad; and a magnetic transducer disposed near a trailing edge of the rear rail surface of the rear pad; wherein the rear rail surface of the rear pad is provided with a vibration suppressing groove formed deeper than the rear rail surface and closed at a periphery thereof.

In a fourth aspect of the present invention there is provided a magnetic head slider adapted to fly over a surface of a magnetic recording medium and read or write information from or to the magnetic recording medium. This magnetic head slide includes: a slider air bearing surface including: a front pad including, on a leading edge side, a front rail surface and a front step bearing surface deeper than the front rail surface; a rear pad including, on a trailing edge side, a rear rail surface and a rear step bearing surface deeper than the rear rail surface; and a negative-pressure groove interposed between the front pad and the rear pad; and a magnetic transducer disposed near a trailing edge of the rear rail surface of the rear pad; side pads positioned on both sides of the rear rail surface of the rear pad so as to have respective side rail surfaces; and vibration suppressing grooves provided in the side rail surfaces respectively so as to be formed deeper than the side rail surfaces and to be closed at a periphery thereof.

According to the present invention it is possible to provide a magnetic disk drive and a magnetic head slider capable of quickly damping translational, pitching and rolling vibrations in the flying height direction of the magnetic head slider while stabilizing the flying of the magnetic head slider.

BRIEF DESCRIPTION OF THE DRAWINGS

FIG. 12 is a diagram showing a change in damping coefficient for a vibration of 200 kHz with a change in the distance from the vibration suppressing groove to the magnetic transducer in the first embodiment.

FIG. 13 is a diagram of a magnetic head slider according to a second embodiment of the present invention as viewed from the air bearing surface side of the slider.

DETAILED DESCRIPTION OF THE INVENTION

Figure 1:
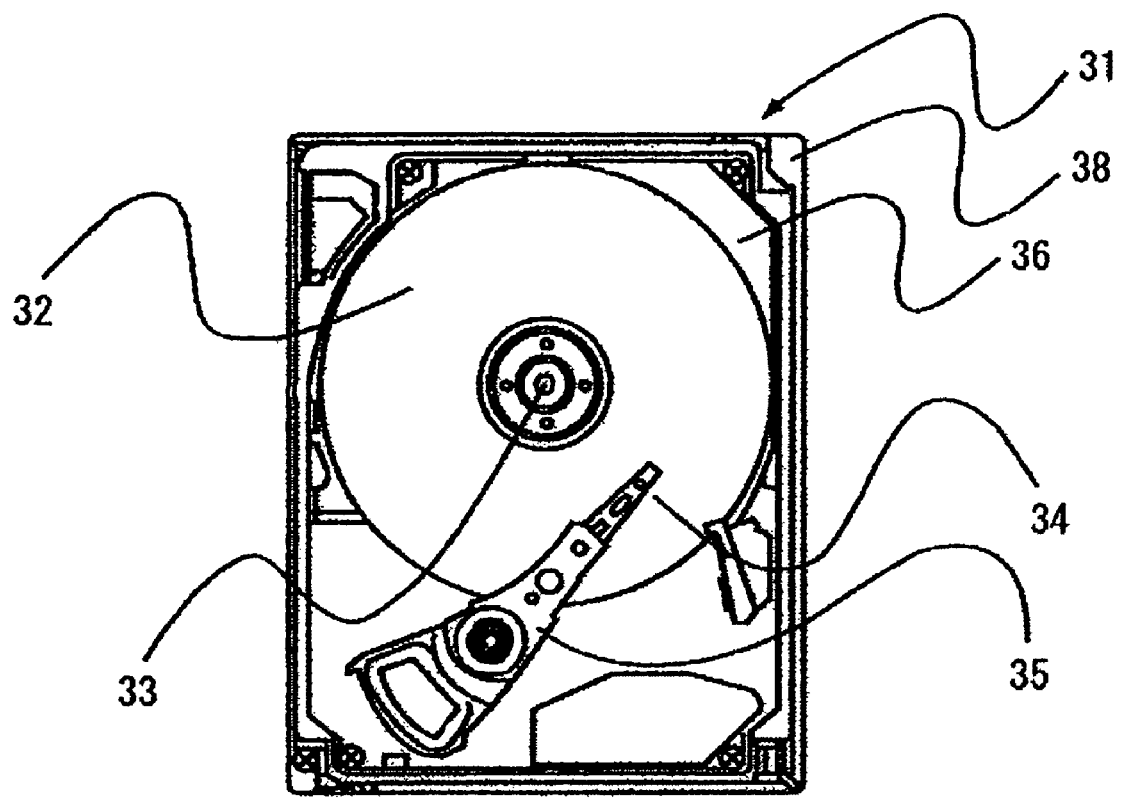
FIG. 1 is a plan view of a magnetic disk drive according to a first embodiment of the present invention.

Embodiments of the present invention will be described hereunder with reference to the drawings. In the drawings of the embodiments, the same reference numerals indicate the same or equivalent portions. The present invention includes a case where the embodiments are suitably combined as necessary into a more effective embodiment.

First Embodiment

A magnetic disk drive and a magnetic head slider according to a first embodiment of the present invention will be described below with reference to FIGS. 1 to 12.

First, the overall construction of the magnetic disk drive according to this embodiment will be described with reference to FIG. 1. FIG. 1 is a plan view of the magnetic disk drive.

The magnetic disk drive, indicated at 31, includes a magnetic recording medium 32, a spindle motor 33, a magnetic head slider 34, an actuator 35, a case 36, a circuit board (not shown), and a buffer member 38.

The magnetic recording medium 32 is formed in the shape of a disc and has tracks onto which information is recorded. Under the action of an air flow created with rotation of the magnetic recording disk 32, the magnetic head slider 34 flies at a slight gap over a magnetic disk surface and reads information recorded on the magnetic recording medium 32 or writes information to the same medium. The actuator 35, which carries the magnetic head slider 34 on its tip portion, causes the magnetic head slider 34 to move radially over the magnetic disk surface and position it on a predetermined track. The spindle motor 33 supports the magnetic recording medium 32 rotatably and makes the magnetic recording medium rotate at high-speed.

The case 36 is formed in a thin rectangular shape and houses therein the magnetic recording medium 32, the actuator 35 and the spindle motor 33. A cover (not shown) is provided as an upper surface of the case 36. A circuit board uses a printed circuit board that controls the spindle motor 33 and the actuator 35. The circuit board is installed below a lower surface of the case 36. With screws or the like, the circuit board is mounted to a bracket attached to the case 36 and is positioned in parallel with the lower surface of the case 36. The buffer member 38 is for buffering an external shock and the like and is installed so as to cover the whole of side faces of the case 36.

Figure 2:
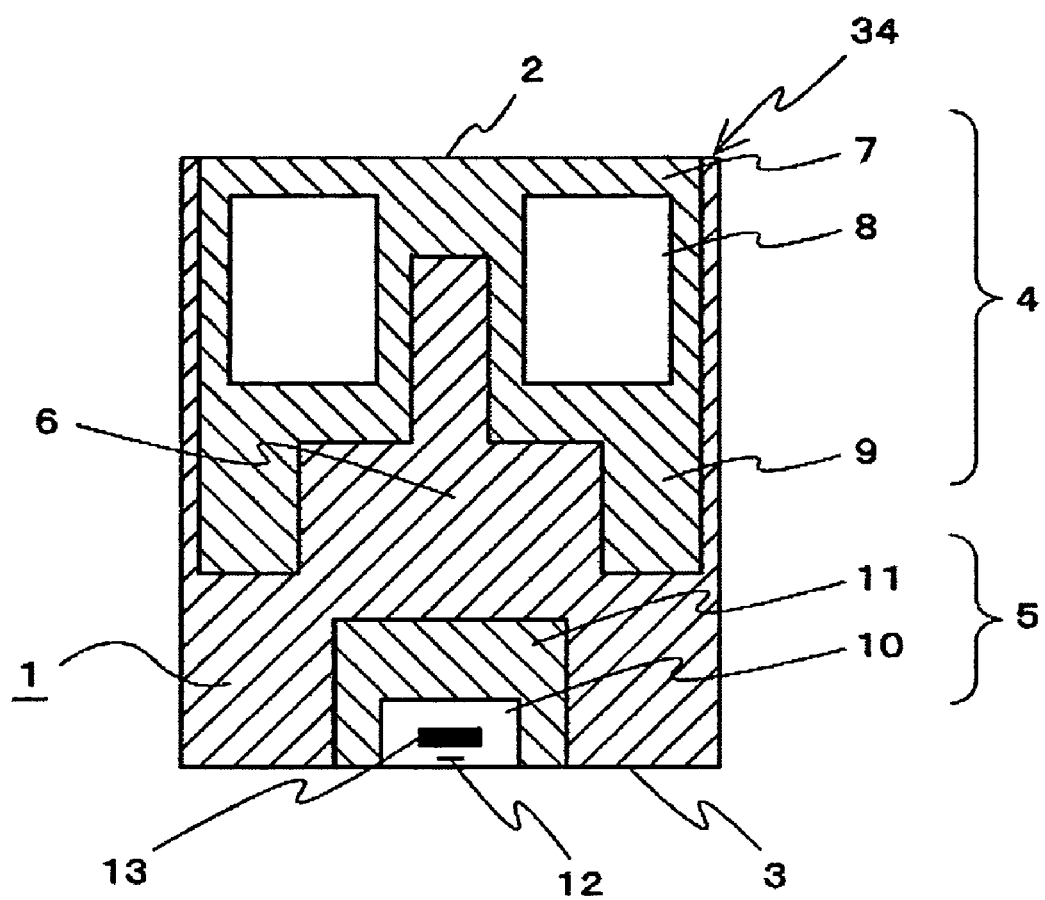
FIG. 2 is a diagram of the magnetic head slider of the first embodiment as viewed from a slider air bearing surface side.

Next, the magnetic head slider 34 according to this embodiment will be described below with reference to FIG. 2. FIG. 2 is a diagram of the magnetic head slider 34 as viewed from an air bearing surface side of the slider.

The magnetic head slider 34 is provided with a slider air bearing surface 1 having a leading edge 2 and a trailing edge 3. The slider air bearing surface 1 includes a front pad 4 provided on the leading edge side, a rear pad 5 provided on the trailing edge side, and a negative-pressure groove 6 interposed between the front pad 4 and the rear pad 5.

The front pad 4 is made up of two front rail surfaces 8 positioned on both sides away from each other and a front step bearing surface 7 deeper than the front rail surface 8. The front step bearing surface 7 is provided so as to surround the front rail surface 8 and is connected on the leading edge side. Further a side step bearing surface 9 is provided which extends from both sides of the front step bearing surface 7 toward the trailing edge side.

The rear pad 5 includes a rear rail surface 10 positioned centrally on the trailing edge side and a rear step bearing surface 11 deeper than the rear rail surface 10. The rear step bearing surface 11 is formed so as to surround the rear step rail surface 10 except its trailing edge side part.

The negative-pressure groove 6 is formed deeper than the front step bearing surfaces 8, the side step bearing surfaces 9 and the rear step bearing surface 11 and is provided on both sides of the front step bearing surface 8, the side step bearing surfaces 9 and the rear step bearing surface 11.

A magnetic transducer 12 for read or write of information from or to the magnetic recording medium 32 is disposed centrally of the rear rail surface 10 and near the trailing edge 3.

A vibration suppressing groove 13 is formed in the rear rail surface 10 of the rear pad 5. The vibration suppressing groove 13 is formed deeper than the rear rail surface 10 and closed at its periphery. The vibration suppressing groove 13 is positioned on the leading edge side of the magnetic transducer 12 and in the vicinity of the magnetic transducer. The vibration suppressing groove 13 is formed deeper than the rear rail surface 10 and shallower than the negative-pressure groove 6. The vibration suppressing groove 13 is formed so as to extend along the magnetic transducer 12 and project from both ends thereof toward both sides thereof.

According to this embodiment, since the vibration suppressing groove 13, which is deeper than the rear rail surface 10 of the rear pad 5 and is closed at its periphery, is formed in the rear rail surface 10, it is possible to improve the damping coefficient in the vicinity of an air membrane rigid natural frequency. Consequently, translational and pitching vibrations in the flying height direction of the magnetic head slider 34 can be damped quickly while stabilizing the flying of the magnetic head slider 34. The formation of the vibration suppressing groove 13 can be done easily by merely adding some modifications to several steps in the existing process for forming a slider air bearing surface.

Figure 3:
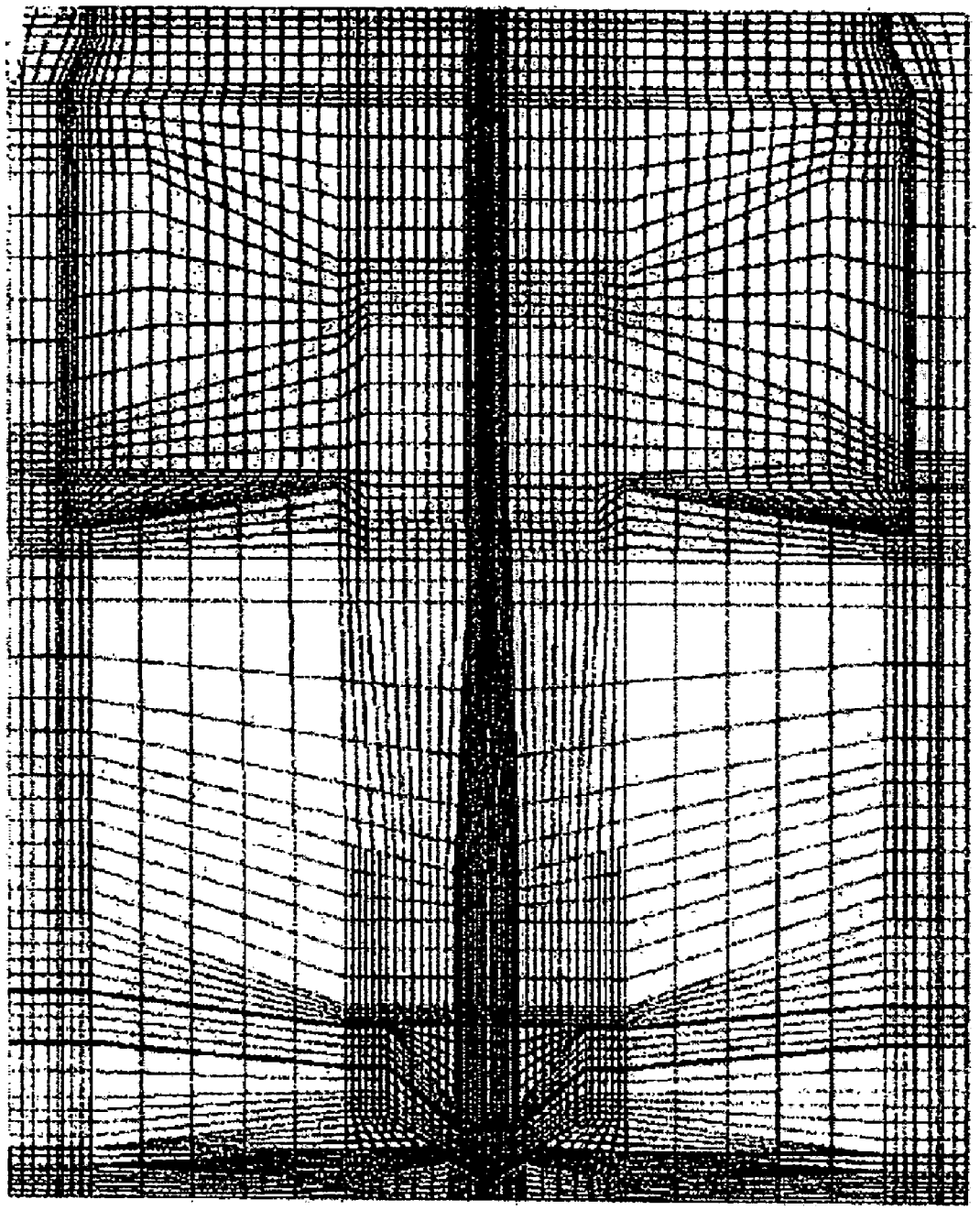
FIG. 3 is a plan view of an air bearing surface model used in calculation for checking the magnetic head slider shown in FIG. 2.
Figure 4:
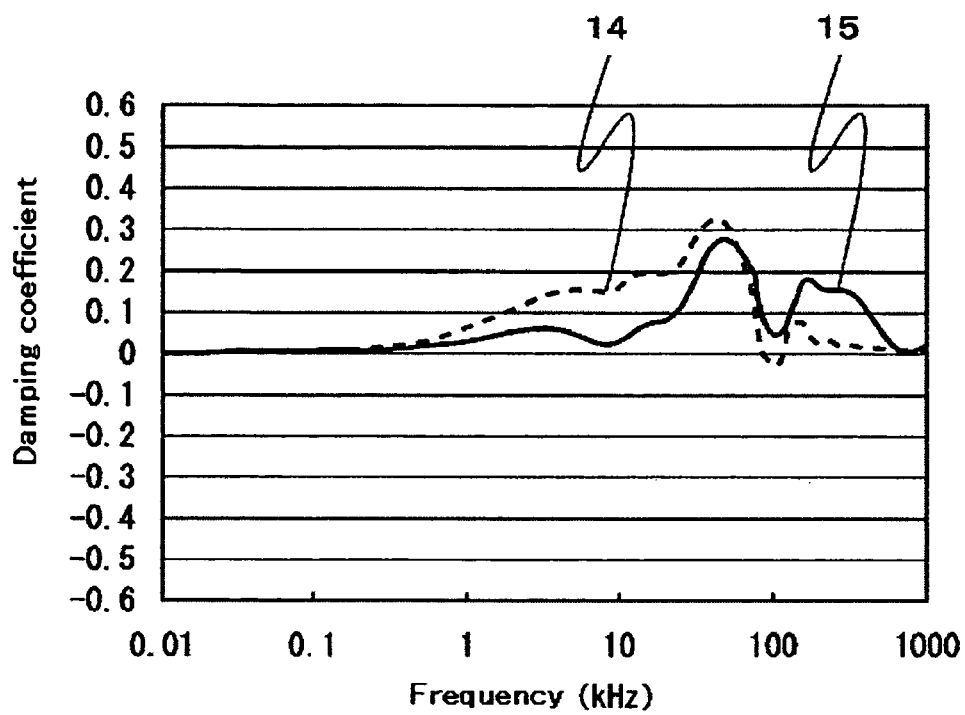
FIG. 4 is a diagram showing calculation results of damping coefficients for a translational vibration in the flying height direction of magnetic head sliders on the basis of the air bearing surface model shown in FIG. 3.
Figure 5:
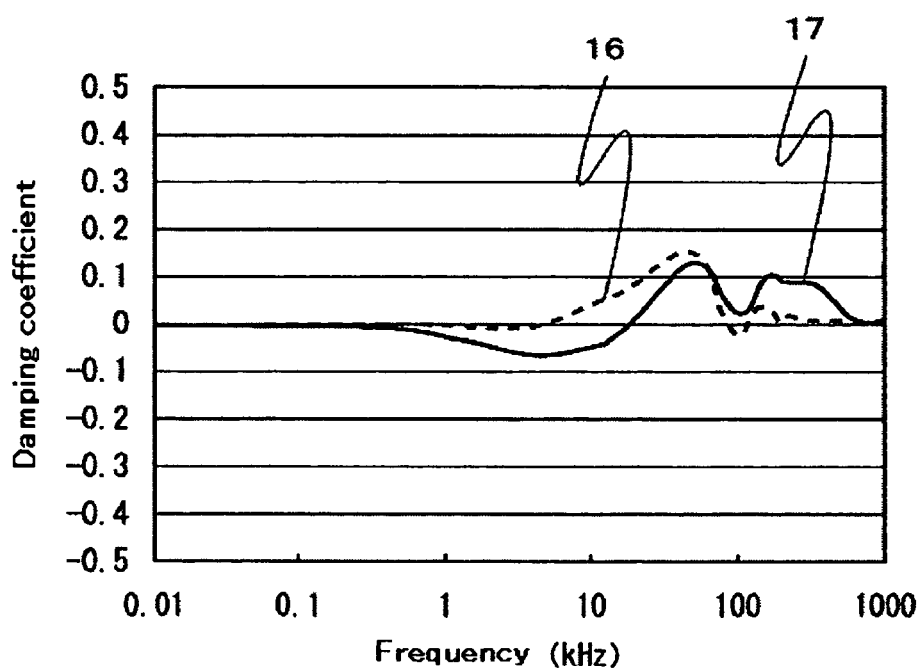
FIG. 5 is a diagram showing calculation results of damping coefficients for a pitching vibration in the flying height direction of magnetic head sliders on the basis of the air bearing surface model shown in FIG. 3.

Next, with reference to FIGS. 3 to 5, a specific description will be given about the point that translational and pitching vibrations in the flying height direction of the magnetic head slider 34 can be damped quickly by forming the vibration suppressing groove 13. FIG. 3 is a plan view of an air bearing surface model used for calculation to check the magnetic head slider 34 shown in FIG. 2. FIG. 4 is a diagram showing calculation results of damping coefficients for a translational vibration in the flying height direction of magnetic head sliders obtained using the air bearing surface model shown in FIG. 3. FIG. 5 is a diagram showing calculation results of damping coefficients for a pitching vibration in the flying height direction of magnetic head sliders obtained using the air bearing surface model shown in FIG. 3. In FIGS. 4 and 5, frequency is plotted along the axis of abscissa and damping coefficient along the axis of ordinate.

The natural frequency of an air membrane present between the slider air bearing surface 1 and the magnetic recording medium 32 during flying of the magnetic head slider 34 is in the range of 100 to 300 kHz with respect to translational, pitching and rolling vibrations. Analysis of frequency components in the vibration of contact with the magnetic recording medium 32 has revealed that the proportion of a natural frequency component in the aforesaid range is large.

However, as indicated by characteristic curves 14 and 16 in FIGS. 4 and 5, damping coefficients for translational and pitching vibrations in a conventional magnetic head slider 34 not provided with the vibration suppressing groove 13 are larger in the frequency range lower than 100 kHz and small in the air membrane natural frequency range of 100 to 300 kHz. As a result, it was impossible to quickly damp translational and pitching vibrations in the flying height direction of the magnetic head slider 34.

On the other hand, as indicated by characteristic curves 15 and 17 in FIGS. 4 and 5, damping coefficients for translational and pitching vibrations in the magnetic head slider 34 according to this embodiment provided with the vibration suppressing groove 13 are large in the air membrane natural frequency range of 100 to 300 kHz. Therefore, it is possible to quickly damp translational and pitching vibrations in the flying height direction of the magnetic head slider 34.

In FIG. 4, the characteristic curve 14 indicated by a broken line represents the results of calculation of a damping coefficient for a translational vibration in the flying height direction of the magnetic head slider 34 not provided with the vibration suppressing groove 13, while the characteristic curve 15 indicated by a solid line represents the results of calculation of a damping coefficient for a translational vibration in the flying height direction of the magnetic head slider 34 according to this embodiment provided with the vibration suppressing groove 13. Likewise, in FIG. 5, the characteristic curve 16 indicated by a broken line represents the result of calculation of a damping coefficient against a pitching vibration in the flying height direction of the magnetic head slider 34 not provided with the vibration suppressing groove 13. On the other hand, the characteristic curve 17 indicated by a solid line represents the results of calculation of a damping coefficient for a pitching vibration in the flying height direction of the magnetic head slider 34 according to this embodiment provided with the vibration suppressing groove 13.

Figure 6:
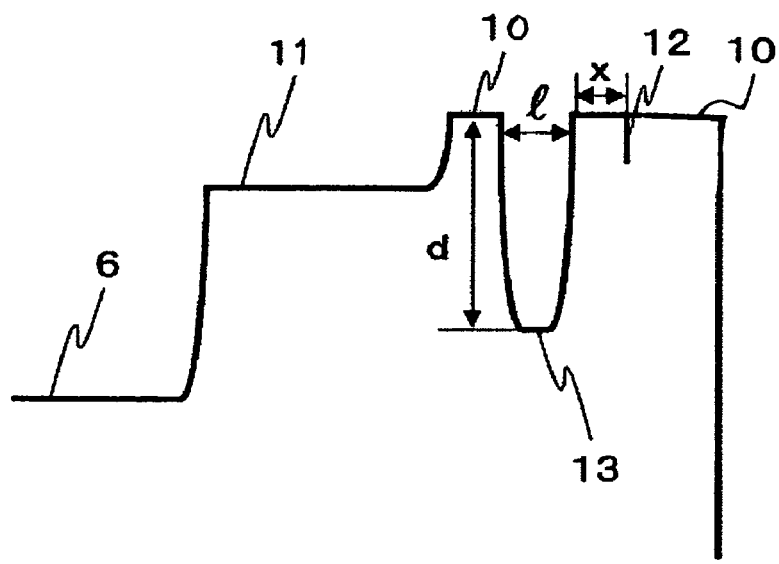
FIG. 6 is a sectional view, in an air inflow direction, illustrating the vicinity of a vibration suppressing groove in the magnetic head slider of the first embodiment.
Figure 7:
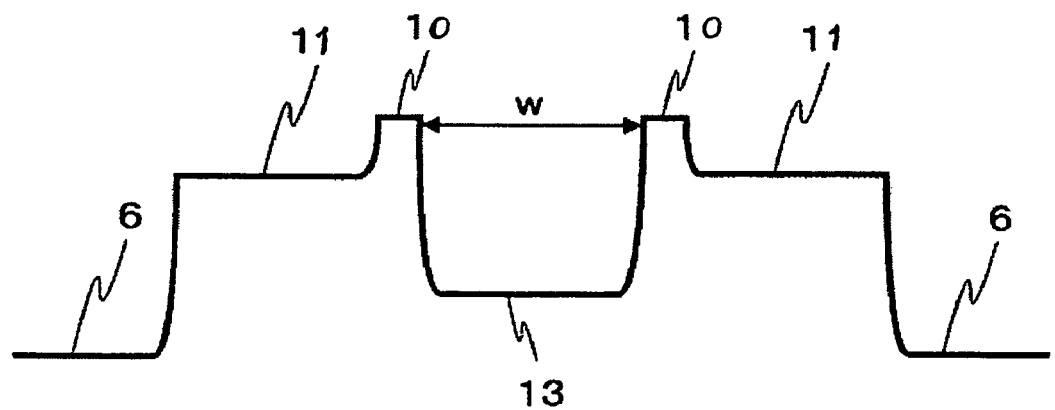
FIG. 7 is a sectional view, in a direction intersecting the air inflow direction, illustrating the vicinity of the vibration suppressing groove in the magnetic head slider of the first embodiment.
Figure 8:
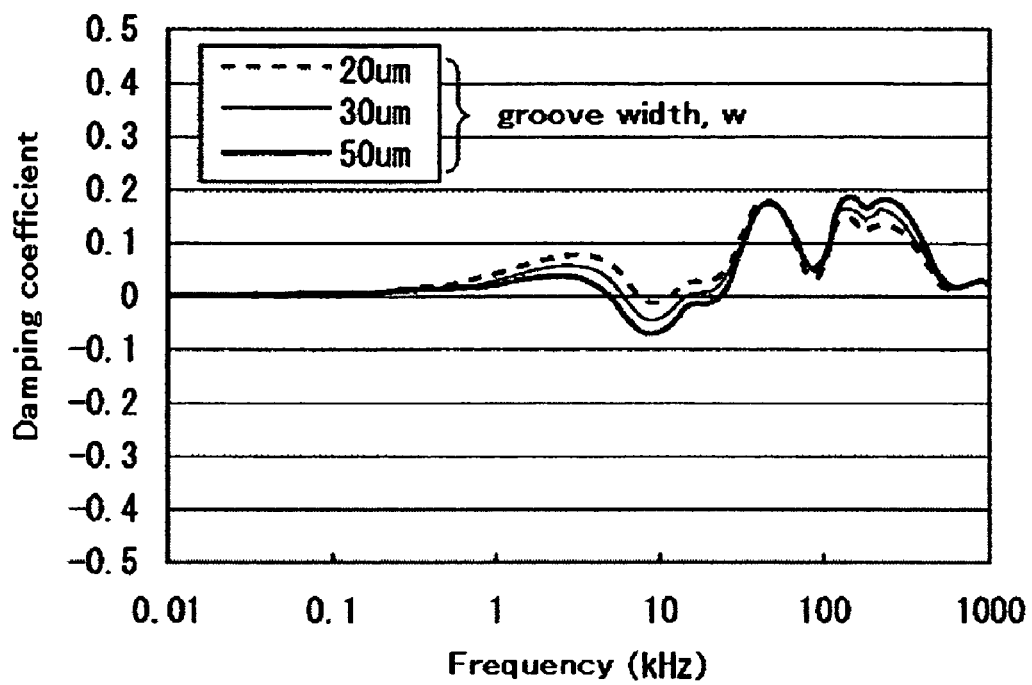
FIG. 8 is a diagram showing a change in damping coefficient with a change in width of the vibration suppressing groove in the first embodiment.
Figure 9:
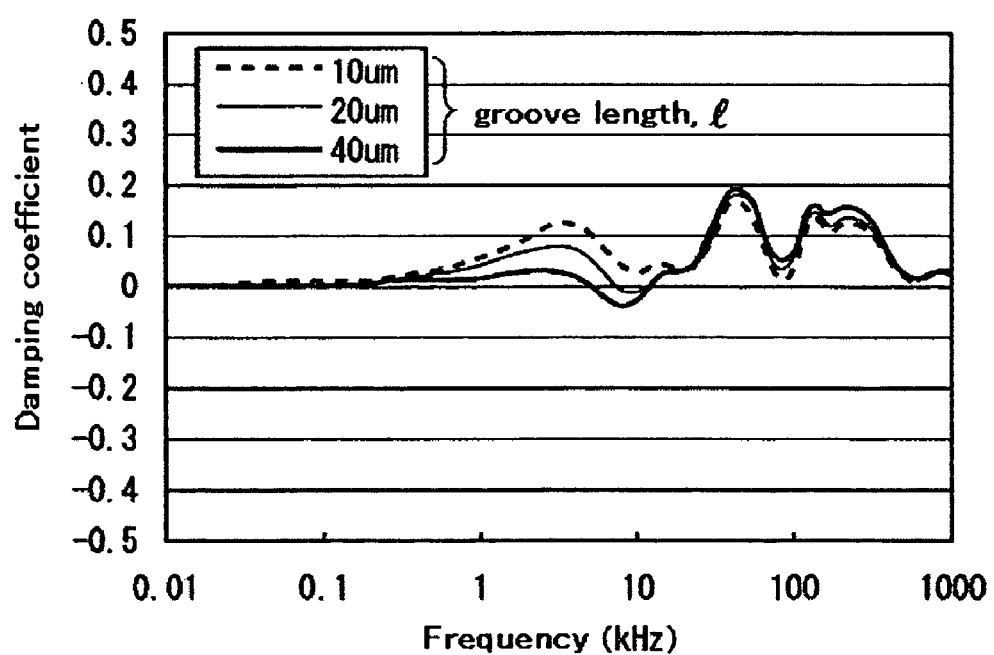
FIG. 9 is a diagram showing a change in damping coefficient with a change in length of the vibration suppressing groove in the first embodiment.
Figure 10:
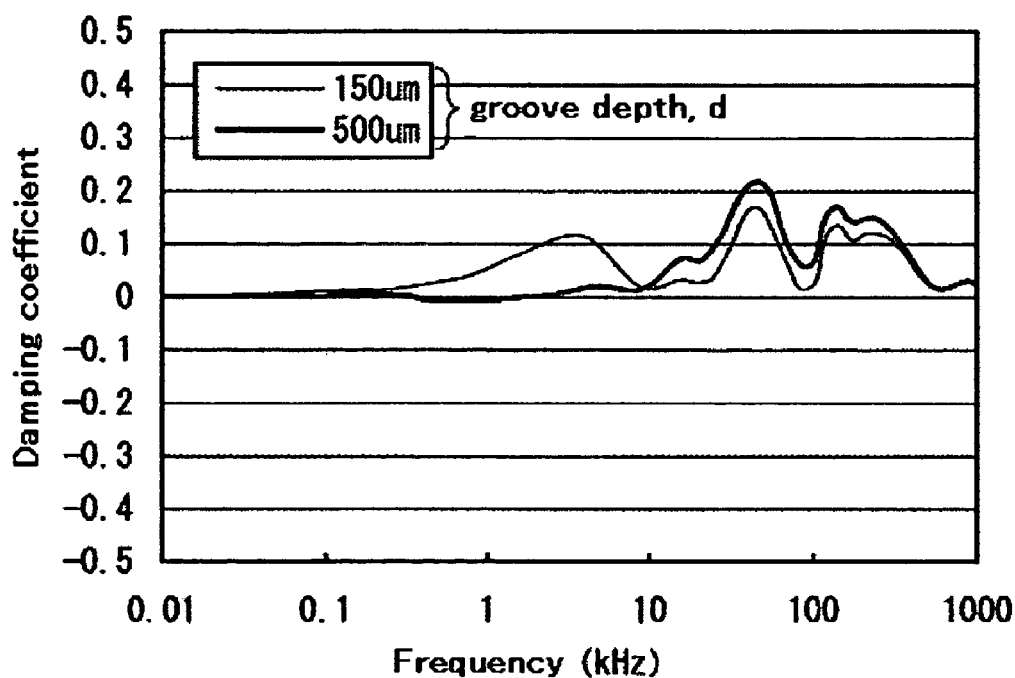
FIG. 10 is a diagram showing a change in damping coefficient with a change in depth of the vibration suppressing groove in the first embodiment.
Figure 11:
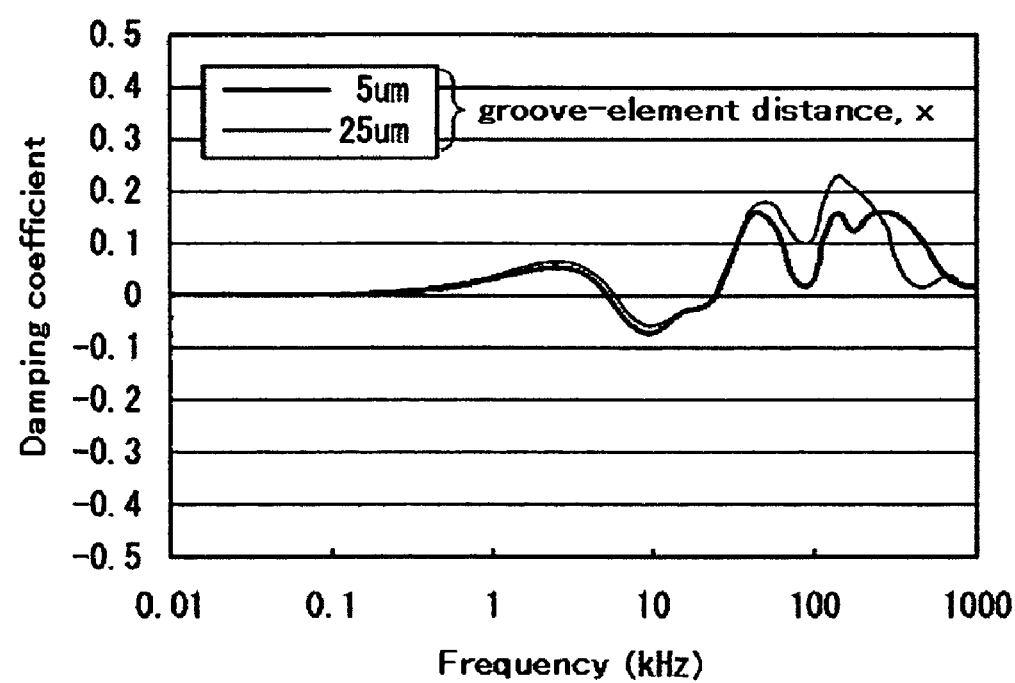
FIG. 11 is a diagram showing a change in damping coefficient with a change in the distance from the vibration suppressing groove to a magnetic transducer in the first embodiment.
Figure 1:
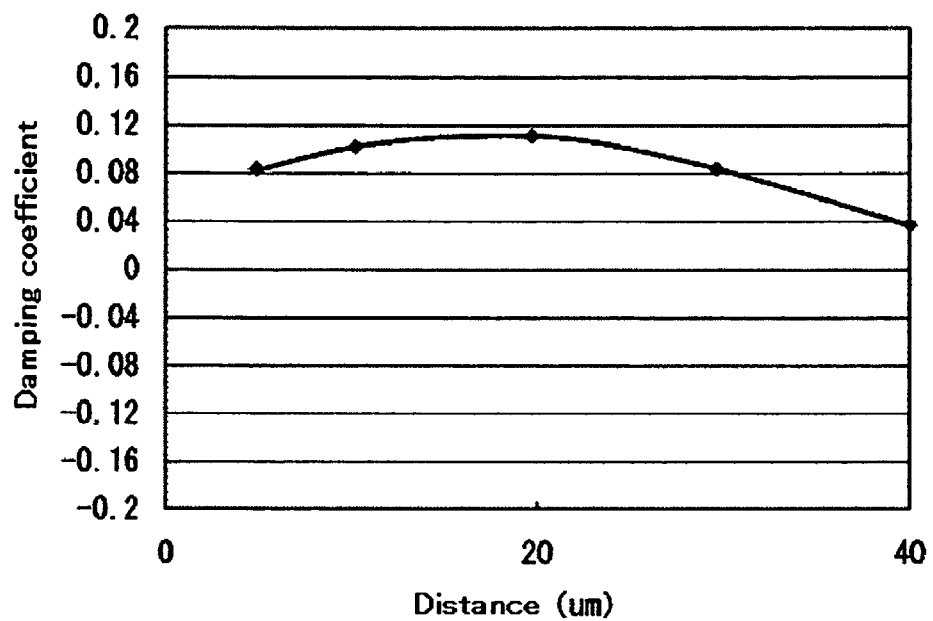
Figure 1:
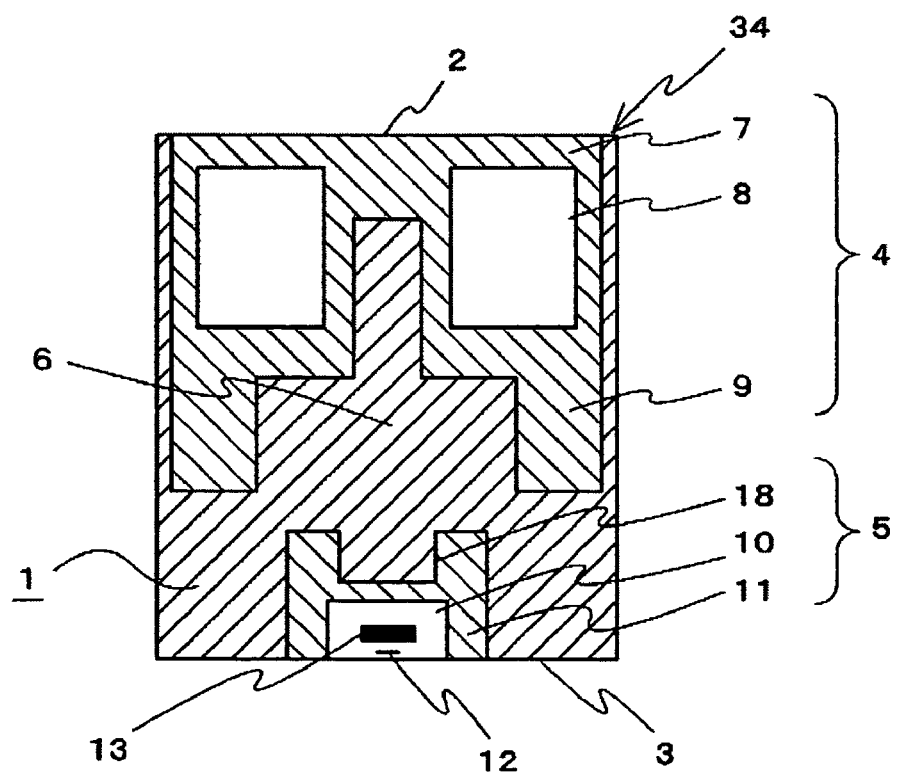

Next, with reference to FIGS. 6 to 12, the following description is provided about how the width w, length l and depth d of the vibration suppressing groove 13 in the magnetic head slider 34, as well as the distance from the vibration suppressing groove 13 to the magnetic transducer 12, are related to damping characteristics. FIG. 6 is a sectional view of the magnetic head slider 34 according to this embodiment in the air inflow direction and in the vicinity of the vibration suppressing groove 13. FIG. 7 is a sectional view of the magnetic head slider 34 according to this embodiment in a direction intersecting the air inflow direction and in the vicinity of the vibration suppressing groove 13. The illustrations of FIGS. 6 and 7 are more exaggerated than actuality. FIGS. 8 to 10 show how the damping coefficient changes with a change in width w, length l and depth d of the vibration suppressing groove 13 in this embodiment. FIG. 11 shows how the damping coefficient changes with a change in the distance x from the vibration suppressing groove 13 in this embodiment up to the magnetic transducer 12. FIG. 12 shows how the damping coefficient changes for a frequency of 200 kHz with a change in the distance x from the vibration suppressing groove 13 in this embodiment up to the magnetic transducer 12.

It is seen from FIGS. 8 to 10 that in the magnetic head slider 34 according to this embodiment, the larger the width w, length l and depth d of the vibration suppressing groove 13, the more improved the damping coefficient in the range of 100 to 300 kHz, but that a sufficient effect can be obtained at a certain degree of width w, length l and depth d. A higher damping effect can be expected by optimizing these parameters.

According to the calculation results of FIGS. 8 to 10, while peak values of the damping coefficient in the range of 100 to 300 kHz change with a change in parameters w, l and d of the vibration suppressing groove 13, peak frequency values do not change so greatly. However, the peak frequency values can be shifted by the distance x from the vibration suppressing groove 13 to the magnetic transducer 12. That is, it is seen from FIG. 11 that the peak of the damping coefficient shifts to the higher frequencies as the vibration suppressing groove 13 is approximated to the magnetic transducer 12.

It is seen from FIG. 12 that when the distance x from the vibration suppressing groove 13 to the magnetic transducer 12 is about 20 μm, the highest damping effect can be obtained for the vibration of 200 kHz. This result shows the following. An air membrane resonance frequency of each ABS design (air bearing surface design) is determined and for the frequency thus determined the relationship between the distance x from the vibration suppressing groove 13 to the magnetic transducer 12 and the damping coefficient is determined. In this way, adjustment can be made to produce the highest damping effect.

Thus, it is possible to optimize the groove shape for attaining a higher damping effect by adjusting the distance x from the vibration suppressing groove 13 to the magnetic transducer 12 to shift the peak frequency position of the damping coefficient and by selecting suitable width w, length l and depth d of the vibration suppressing groove 13, according to each ABS design.

Second Embodiment

Figure 14:
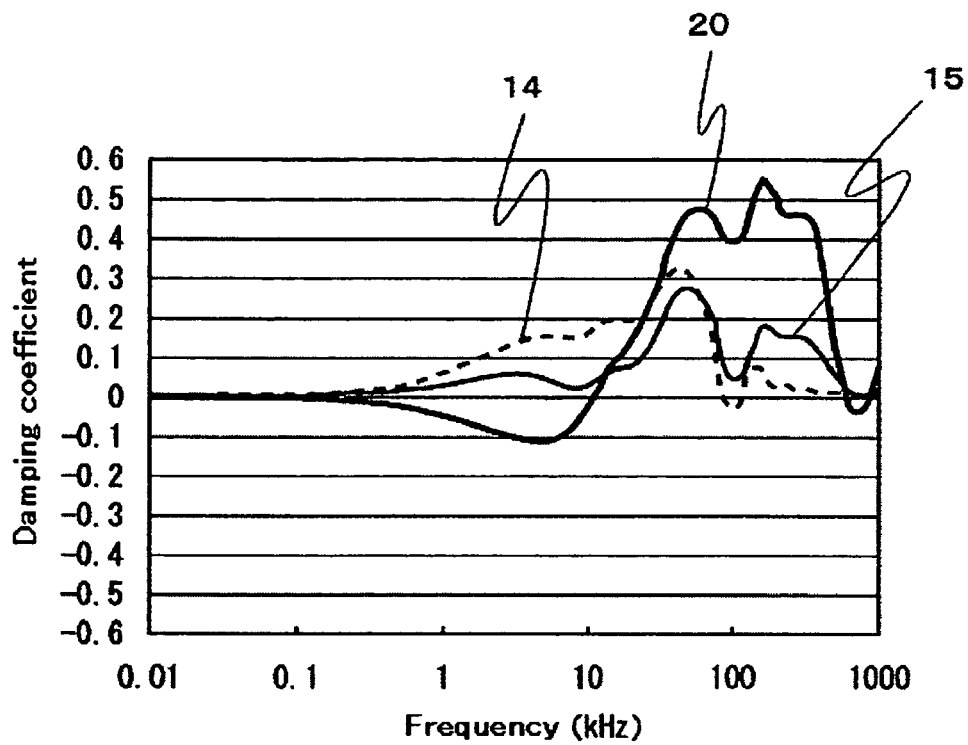
FIG. 14 is a diagram showing calculation results of damping coefficients for a translational vibration in the flying height direction of magnetic head sliders on the basis of an air bearing surface model used in the second embodiment.
Figure 15:
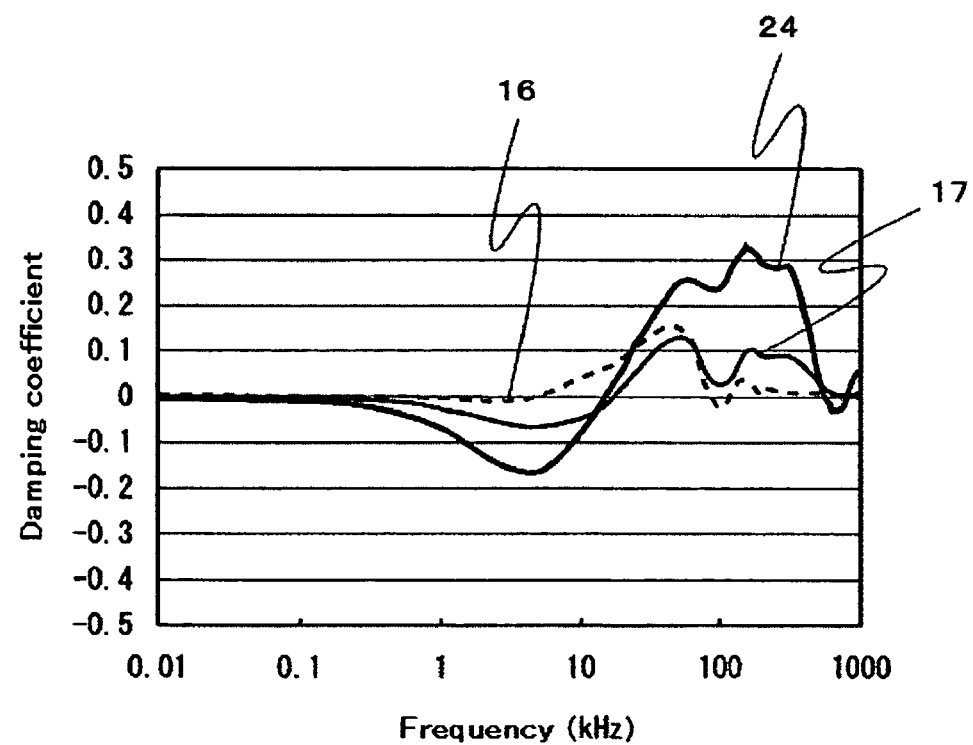
FIG. 15 is a diagram showing calculation results of damping coefficients for a pitching vibration in the flying height direction of magnetic head sliders on the basis the air bearing surface model used in the second embodiment.

Next, a second embodiment of the present invention will be described with reference to FIGS. 13 to 15. FIG. 13 is a diagram of a magnetic head slider 34 according to a second embodiment of the present invention as viewed from the air bearing surface side of the slider. FIG. 14 is a diagram showing calculation results of damping coefficients for a translational vibration in the flying height direction of magnetic head sliders on the basis of an air bearing surface model used in the second embodiment. FIG. 15 is a diagram showing calculation results of damping coefficients for a pitching vibration in the flying height direction of magnetic head sliders on the basis of the air bearing surface model used in the second embodiment. In FIGS. 14 and 15, frequency is plotted along the axis of abscissa and damping coefficient along the axis of ordinate.

This second embodiment is different in the following point from the first embodiment and is basically the same in the other points as the first embodiment, so tautological explanations will be omitted.

This second embodiment is constructed to increase the amount of an air flow advancing toward the vibration suppressing groove 13 as compared with the first embodiment. That is, an air flow adjusting groove 18 which is open to the leading edge side is formed in the rear step bearing surface 11 which is positioned on the leading edge side with respect to the rear rail surface 10. This increases the amount of air flowing toward the rear step bearing surface 11 through the air flow adjusting groove 18, thereby increasing the amount of air flowing toward the vibration suppressing groove 13 positioned on the trailing edge side.

According to such a construction, damping coefficients of translational and pitching vibrations in the magnetic head slider 34 become very large in the air membrane natural frequency range of 100 to 300 kHz, as indicated by characteristic curves 20 and 24 in FIGS. 14 and 15, respectively. Consequently, translational and pitching vibrations in the flying height direction of the magnetic head slider 34 can be damped more quickly. Characteristic curves 14 to 17 in FIGS. 14 and 15 are respectively the same as the characteristic curves 14 to 17 in FIGS. 4 and 5.

Third Embodiment

Figure 16:
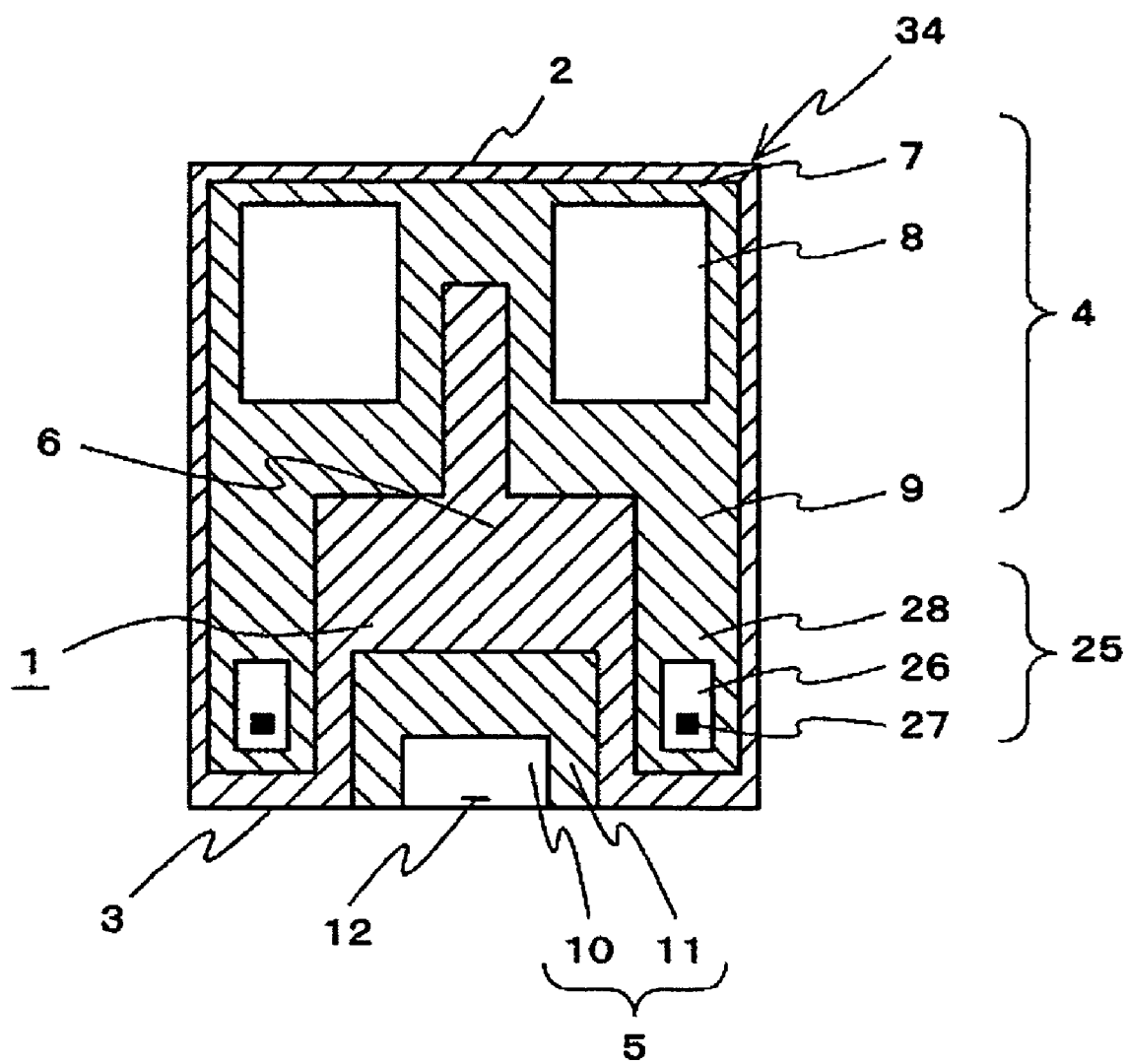
FIG. 16 is a diagram of a magnetic head slider according to a third embodiment of the present invention as viewed from the air bearing surface side of the slider.
Figure 17:
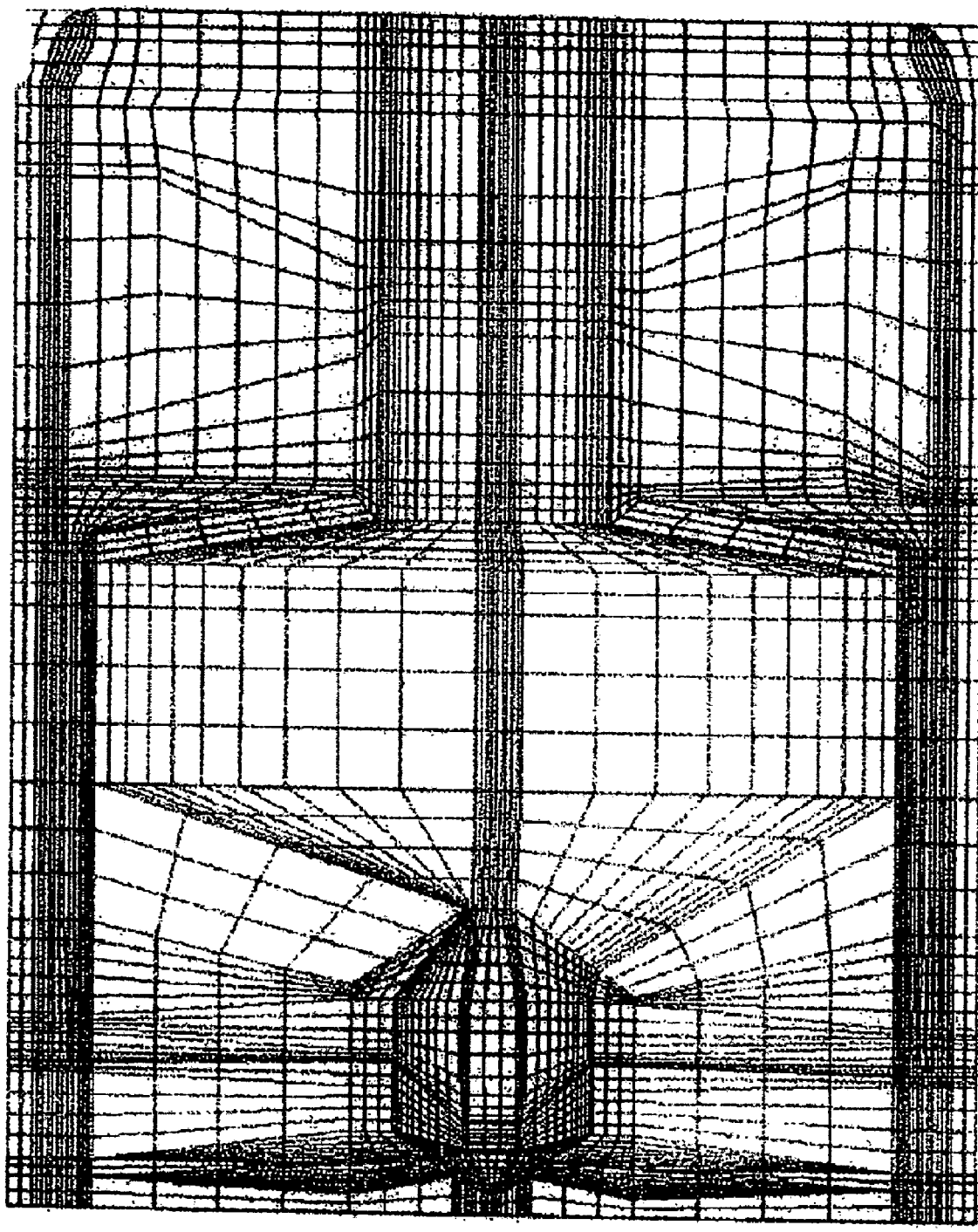
FIG. 17 is a plan view of an air bearing surface model used in calculation for checking the magnetic head slider shown in FIG. 16.
Figure 18:
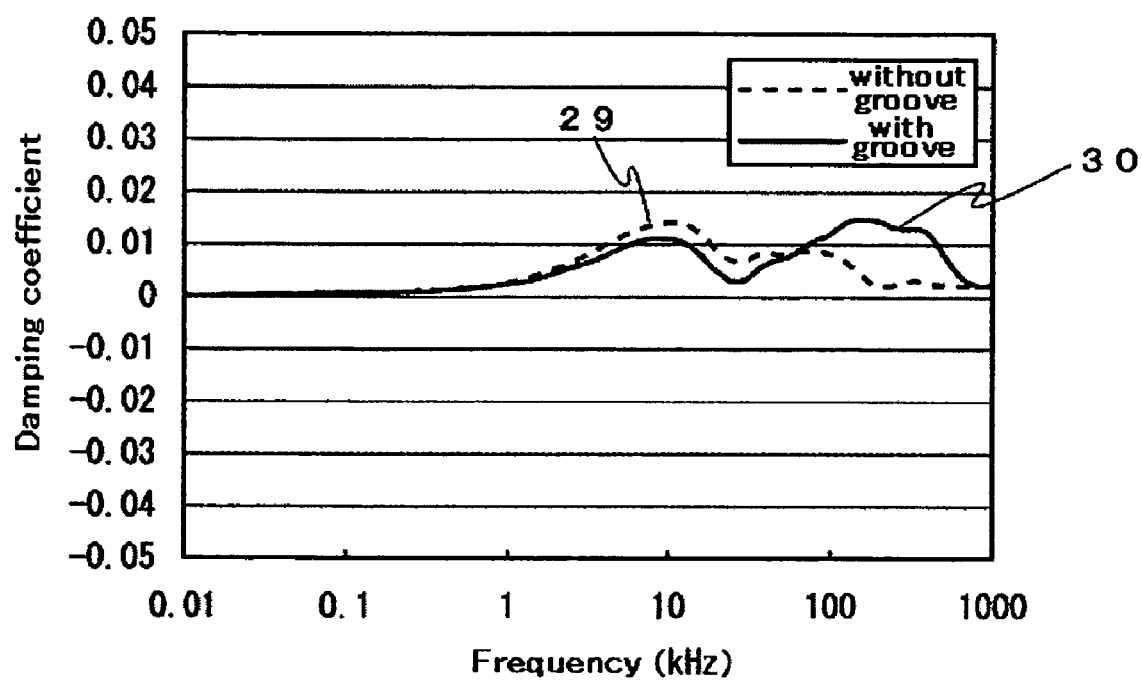
FIG. 18 is a diagram showing calculation results of damping coefficients for a rolling vibration in the flying height direction of magnetic head sliders on the basis of the air bearing surface model used in the third embodiment.

Next, a third embodiment of the present invention will be described with reference to FIGS. 16 to 18. FIG. 16 is a diagram of a magnetic head slider according to a third embodiment of the present invention as viewed from the air bearing surface side of the slider. FIG. 17 is a plan view of an air bearing surface model for checkable calculation of the magnetic head slider 34 shown in FIG. 16. FIG. 18 illustrates calculation results of damping coefficients for a rolling vibration in the flying height direction of the magnetic head slider on the basis of the air bearing surface model used in this third embodiment. In FIG. 18, frequency is plotted along the axis of abscissa and damping coefficient along the axis of ordinate. A characteristic curve 29 indicated by a broken line represents the calculation result of a damping coefficient for a rolling vibration in the flying height direction of a magnetic head slider 34 not provided with the vibration suppressing groove 13. A characteristic curve 30 indicated by a solid line represents the calculation result of a damping coefficient for a pitching vibration in the flying height direction of the magnetic head slider 34 having the vibration suppressing groove 13 according to the third embodiment.

The third embodiment is different in the following point from the first embodiment and is basically the same in the other points as the first embodiment, so tautological explanations will be omitted.

In the third embodiment, a side pad 25 is provided on both sides of the slider air bearing surface 1. The side pad 25 has a side rail surface 26 and a side step bearing surface 28 deeper than the side rail surface 26. A vibration suppressing groove 27 is formed in the side rail surface 26 so as to be deeper than the side rail surface 26 and to be closed at its periphery. The side step bearing surface 28 is formed contiguously to the front step bearing surfaces 9.

According to such a construction of the third embodiment, as indicated by the characteristic curve 30 in FIG. 18, the damping coefficient in the rolling direction during flying of the magnetic head slider 34 can be increased in the range of 100 to 300 kHz and it is possible to quickly damp a rolling vibration in the flying height direction of the magnetic head slider 34. On the other hand, in the case of the magnetic head slider 34 not having the vibration suppressing groove 13, as indicated by the characteristic curve 29 in FIG. 18, the damping coefficient in the rolling direction during flying of the magnetic head slider 34 cannot be increased in the range of 100 to 300 kHz.

Although in this third embodiment the side step bearing surfaces 28 are formed contiguously to the front step bearing surfaces 9, a negative-pressure groove 6 may be interposed between each side step bearing surface 28 and the associated front step bearing surface 9 to isolate the front pad 4 from the side pad 25. Further, although in the third embodiment the vibration suppressing grooves 27 are formed in only the side rail surfaces 26, the vibration suppressing grooves 13 and 27 may be formed in the rear rail surface 10 and the side rail surfaces 26, respectively, in combination with the first or the second embodiment.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
  a magnetic recording medium for recording information; and
  a magnetic head slider adapted to fly over a surface of the magnetic recording medium and read or write information from or to the magnetic recording medium;
  wherein the magnetic head slider includes a slider air bearing surface opposed to the surface of the magnetic recording medium and a magnetic transducer for read or write of information;
  wherein the slider air bearing surface comprises:
  a front pad comprising, on a leading edge side, a front rail surface and a front step bearing surface deeper than the front rail surface;
  a rear pad comprising, on a trailing edge side, a rear rail surface and a rear step bearing surface deeper than the rear rail surface; and
  a negative-pressure groove interposed between the front pad and the rear pad;
  wherein the magnetic transducer is disposed near a trailing edge of the rear rail surface of the rear pad; and
  wherein a vibration suppressing groove is formed in the rear rail surface of the rear pad so as to be deeper than the rear rail surface, shallower than the negative-pressure groove, and is entirely closed about its periphery.

2. The magnetic disk drive according to claim 1, wherein an air flow adjusting groove is formed in the rear step bearing surface to be open toward the leading edge side so that the amount of an air flow advancing toward the vibration suppressing groove increases, the rear step bearing surface being positioned on the leading edge side with respect to the rear rail surface.

3. The magnetic disk drive according to claim 2, further comprising side pads which are positioned on both sides of the slider air bearing surface to have respective side rail surfaces surrounded by respective side step bearing surfaces deeper than the side rail surfaces;
  wherein the side rail surfaces are each provided with a vibration suppressing groove formed deeper than the side rail surfaces and closed at a periphery thereof.

4. The magnetic disk drive according to claim 3, wherein the side rail surface and the side step bearing surface deeper than the side rail surface constitute the side pad, and the side step bearing surface is formed contiguously to the front step bearing surface.

5. The magnetic disk drive according to claim 1, wherein the vibration suppressing groove is formed so as to extend along the magnetic transducer and project from both ends thereof.

6. A magnetic disk drive comprising:
  a magnetic recording medium for recording information; and
  a magnetic head slider adapted to fly over a surface of the magnetic recording medium and read or write information from or to the magnetic recording medium;
  wherein the magnetic head slider includes a slider air bearing surface opposed to the surface of the magnetic recording medium and a magnetic transducer for read or write of information;
  wherein the slider air bearing surface comprises:
  a front pad comprising, on a leading edge side, a front rail surface and a front step bearing surface deeper than the front rail surface;
  a rear pad comprising, on a trailing edge side, a rear rail surface and a rear step bearing surface deeper than the rear rail surface; and
  a negative-pressure groove interposed between the front pad and the rear pad;
  wherein the magnetic transducer is disposed near a trailing edge of the rear rail surface of the rear pad; and
  wherein side pads are positioned on both sides of the slider air bearing surface so as to have respective side rail surfaces surrounded by respective side step bearing surfaces deeper than the side rail surfaces, shallower than the negative-pressure groove, and the side pad surfaces are each provided with a vibration suppressing groove formed deeper than the side rail surfaces and is entirely closed about its periphery, the vibration suppressing groove being symmetrical in section in an air inflow direction.

7. The magnetic disk drive according to claim 6, wherein the side rail surface and the side step bearing surface deeper than the side rail surface constitute the side pad, and the side step bearing surface is formed contiguously to the front step bearing surface.

8. The magnetic disk drive according to claim 6, wherein the rear rail surface of the rear pad is provided with a vibration suppressing groove formed deeper than the rear rail surface and closed at a periphery thereof, the vibration suppressing groove being formed in proximity to a leading edge of the magnetic transducer.

9. The magnetic disk drive according to claim 8, wherein an air flow adjusting groove is formed in the rear step bearing surface to be open toward the leading edge side so that the amount of an air flow advancing toward the vibration suppressing groove of the rear pad increases, the rear step bearing surface being positioned on the leading edge side with respect to the rear rail surface.

10. A magnetic head slider adapted to fly over a surface of a magnetic recording medium and read or write information from or to the magnetic recording medium, comprising:
a slider air bearing surface comprising:
a front pad comprising, on a leading edge side, a front rail surface and a front step bearing surface deeper than the front rail surface;
a rear pad comprising, on a trailing edge side, a rear rail surface and a rear step bearing surface deeper than the rear rail surface; and
a negative-pressure groove interposed between the front pad and the rear pad; and
a magnetic transducer disposed near a trailing edge of the rear rail surface of the rear pad;
wherein the rear rail surface of the rear pad is provided with a vibration suppressing groove formed deeper than the rear rail surface, shallower than the negative-pressure groove, and is entirely closed about its periphery.

11. The magnetic head slider according to claim 10, wherein an air flow adjusting groove is formed in the rear step bearing surface to be open toward the leading edge side so that the amount of an air flow advancing toward the vibration suppressing groove increases, the rear step bearing surface being positioned on the leading edge side with respect to the rear rail surface.

12. The magnetic head slider according to claim 11, further comprising side pads which are positioned on both sides of the slider air bearing surface to have respective side rail surfaces surrounded by respective side step bearing surfaces deeper than the side rail surfaces;
wherein the side rail surfaces are each provided with a vibration suppressing groove formed deeper than the side rail surfaces and closed at a periphery thereof.

13. The magnetic head slider according to claim 10, wherein the vibration suppressing groove is formed so as to extend along the magnetic transducer and project from both ends thereof.

14. A magnetic head slider adapted to fly over a surface of a magnetic recording medium and read or write information from or to the magnetic recording medium, comprising:
a slider air bearing surface comprising:
a front pad comprising, on a leading edge side, a front rail surface and a front step bearing surface deeper than the front rail surface;
a rear pad comprising, on a trailing edge side, a rear rail surface and a rear step bearing surface deeper than the rear rail surface; and
a negative-pressure groove interposed between the front pad and the rear pad; and
a magnetic transducer disposed near a trailing edge of the rear rail surface of the rear pad;
side pads positioned on both sides of the rear rail surface of the rear pad so as to have respective side rail surfaces surrounded by respective side step bearing surfaces deeper than the side rail surfaces; and
vibration suppressing grooves provided in the side rail surfaces respectively so as to be formed deeper than the side rail surfaces, shallower than the negative-pressure groove, and are entirely closed about their respective peripheries, the vibration suppressing grooves being symmetrical in section in an air inflow direction.

15. The magnetic head slider according to claim 14, wherein the side rail surface and the side step bearing surface deeper than the side rail surface constitute the side pad, and the side step bearing surface is formed contiguously to the front step bearing surface.

16. The magnetic head slider according to claim 14, wherein the rear rail surface of the rear pad is provided with a vibration suppressing groove formed deeper than the rear rail surface and closed at a periphery thereof, the vibration suppressing groove being formed in proximity to a leading edge of the magnetic transducer.

17. The magnetic head slider according to claim 16, wherein an air flow adjusting groove is formed in the rear step bearing surface to be open toward the leading edge side so that the amount of an air flow advancing toward the vibration suppressing groove of the rear pad increases, the rear step bearing surface being positioned on the leading edge side with respect to the rear rail surface.

18. The magnetic head slider according to claim 16, wherein the vibration suppressing groove on the rear rail surface of the rear pad is formed so as to extend along the magnetic transducer and project from both ends thereof.

* * * * *